Figure 1:
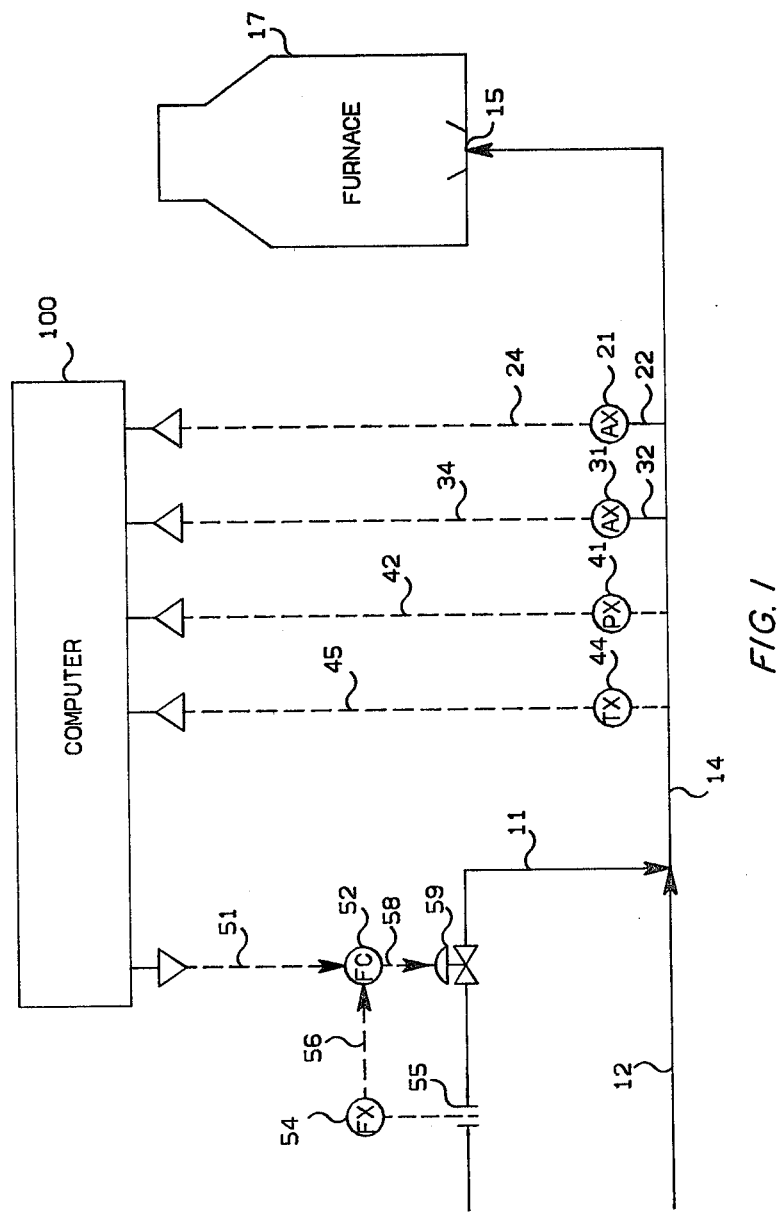

United States Patent [19]

Furr

[11] 4,369,803
[45] Jan. 25, 1983

[54] CONTROL OF FUEL GAS BLENDING

[75] Inventor: Danny L. Furr, Broken Arrow, Okla.

[73] Assignee: Phillips Petroleum Company, Bartlesville, Okla.

[21] Appl. No.: 229,037

[22] Filed: Jan. 28, 1981

[51] Int. Cl.³ .......................... E03B 1/00; F17D 1/00
[52] U.S. Cl. ..................................... 137/6; 48/180 F; 48/180 P; 137/88; 431/12
[58] Field of Search ............ 431/12; 48/180 P, 180 F; 137/3, 4, 6, 7, 88, 79, 80

[56] References Cited

U.S. PATENT DOCUMENTS

| | | | |
|---|---|---|---|
| 2,072,384 | 3/1937 | Schmidt | 48/180 |
| 2,349,521 | 5/1944 | Schmidt | 137/78 |
| 2,608,199 | 8/1952 | Schmidt | 137/6 |
| 2,737,347 | 3/1956 | Lobosco | 137/6 |
| 2,737,965 | 3/1956 | Newman | 137/6 |
| 3,123,086 | 3/1964 | Kleiss | 137/4 |
| 3,721,253 | 3/1973 | Remke | 137/3 |
| 3,913,600 | 10/1975 | Cox | 137/6 |
| 4,118,172 | 10/1978 | Noir | 137/6 |
| 4,187,542 | 2/1980 | Ball | 431/12 |
| 4,303,194 | 12/1981 | Kengle et al. | 431/12 |

OTHER PUBLICATIONS

Chemical Engineer's Handbook, Perry and Chilton, 5th Edition, pp. 13-17.

Primary Examiner—Daniel J. O'Connor

[57] ABSTRACT

In a process in which a fuel gas stream having a high BTU content is mixed with a fuel gas stream having a low BTU content to form a mixed fuel gas stream, the flow rate of the high BTU content fuel gas stream is manipulated to maintain a desired BTU content for the mixed fuel gas stream unless such control based on the desired BTU content for the mixed fuel gas stream would result in condensation in the mixed fuel gas stream. If condensation would occur, then the flow rate of the high BTU content fuel gas stream is manipulated so as to maintain the actual dew point temperature of the mixed fuel gas stream below the actual temperature of the mixed fuel gas stream to prevent condensation.

6 Claims, 2 Drawing Figures

CONTROL OF FUEL GAS BLENDING

This invention relates to control of the mixing of two fuel gas streams having different BTU content. In one aspect this invention relates to method and apparatus for preventing condensation in a fuel gas stream formed by mixing two fuel gas streams having different BTU content. As used herein, the term "BTU content" refers to the number of BTU's which may be obtained by combusting a specified volume of a fuel. The term BTU is used because this is a very common unit for measuring heat. Other measurement units may be utilized but such units are convertible to BTU's by known relationships.

With the high cost of energy, it is often desirable to be able to utilize a hydrocarbon-containing waste gas to supply heat to the process which provided the waste gas or to a different process. The combustion of the waste gas supplies valuable energy and also reduces the problem of disposing of the waste gas. However, the waste gas will typically have a lower BTU value than gases, such as natural gas, which are typically utilized to provide heat to a process. Thus, it is often necessary to mix the waste gas with a higher BTU content gas stream to provide a mixed gas stream having a desired BTU content. This may be accomplished by analyzing the mixed gas stream to determine the BTU content and controlling the flow rate of the high BTU gas stream to maintain a desired BTU content for the mixed gas stream.

Higher BTU content gas streams have higher dew point temperatures than low BTU content gas streams. Thus mixing too much high BTU content gas with a low BTU content gas may result in the mixed gas stream having a dew point temperature above the actual temperature of the mixed gas stream. Care must be taken to not allow the dew point temperature of the mixed gas stream to go above the actual temperature of the mixed gas stream which would allow condensation to occur. Liquid in the mixed gas stream would cause poor performance by the burners using the mixed gas stream.

It is thus an object of this invention to provide method and apparatus for preventing condensation in a fuel gas stream formed by mixing two fuel gas streams having different BTU content.

In accordance with the present invention, method and apparatus is provided whereby the flow rate of a high BTU content fuel gas stream being mixed with a low BTU content fuel gas stream is manipulated so as to provide a mixed fuel gas stream having a desired BTU content unless such control would result in condensation in the mixed fuel gas stream in which case the flow rate of the high BTU fuel gas stream is manipulated so as to maintain the actual dew point of the mixed fuel gas stream below the actual temperature of the mixed fuel gas stream. In general, this may be accomplished by determining the actual BTU content of the mixed fuel gas stream and comparing this actual BTU content to a desired BTU content to derive a first control signal which is scaled so as to be representative of the flow rate of the high BTU content gas stream required to maintain a desired BTU content for the mixed fuel gas stream. The actual dew point temperature for the mixed fuel gas stream is also determined and utilized to derive a second control signal which is scaled so as to be representative of the flow rate of the high BTU content fuel gas stream required to maintain the actual dew point temperature for the mixed fuel gas stream below the actual temperature of the mixed fuel gas stream. The flow rate of the high BTU content fuel gas stream may be manipulated in response to the lower of the first and second control signals to thereby maintain a desired BTU content for the mixed fuel gas stream unless control based on BTU content would cause condensation in the mixed fuel gas stream in which case the second control signal is utilized as the controlling signal.

Figure 2:
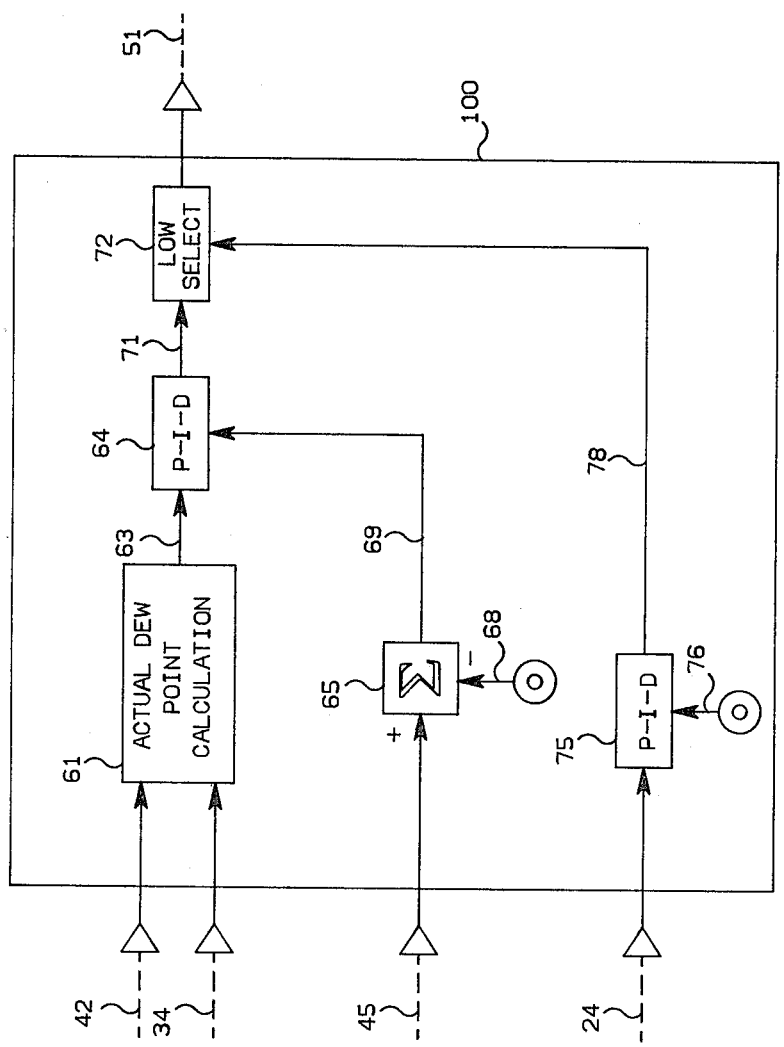

Other objects and advantages of the invention will be apparent from the foregoing brief description of the invention and the claims as well as the detailed description of the drawings in which:

FIG. 1 is a diagrammatic illustration of the mixing of a high BTU content fuel gas stream with a low BTU content fuel gas stream and the associated control system of the present invention; and FIG. 2 is a logic flow diagram for the computer logic utilized to generate the control signal illustrated in FIG. 1 based on the measurements for the mixed fuel gas stream.

The invention is illustrated and described in terms of supplying fuel to a burner for a furnace. However, the mixed fuel gas stream may be supplied to other process equipment which utilize burners. The invention is also illustrated and described in terms of mixing only two fuel gas streams. However, the invention is applicable to the mixing of multiple fuel gas streams where a plurality of lower BTU fuel gas streams are being mixed with a high BTU fuel gas stream.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be penumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signals based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Both the analog and digital controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention. The operation of proportional-integral-derivative controllers is well known in the art. The output control signal of a proportional-integral-derivative controller may be represented as $$S = K_1 E + K_2 \int E\,dt + K_3 (dE/dT)$$

where

S = output control signals;
E = difference between two input signals; and
$K_1$, $K_2$ and $K_3$ = constants.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings and in particular to FIG. 1, a high BTU content fuel gas stream, such as methane having a BTU content of approximately 1000 BTU per cubic foot flowing through conduit means 11 is mixed with a low BTU content fuel gas stream, such as a process waste gas having a 50% methane content and a BTU content of approximately 600 BTU per cubic foot, flowing through conduit means 12 and the resulting mixture is provided through conduit means 14 to the burner 15 of the furnace 17. The BTU content of the high BTU fuel gas and low BTU fuel gas can vary widely from the typical numbers given.

Analyzer transducer 21 is preferably a chromatographic BTU analyzer. A sample of the fuel gas flowing through conduit means 14 is provided to the analyzer transducer 21 through conduit means 22. The analyzer transducer 21 provides an output signal 24 which is representative of the number of BTU's in each cubic foot of the fuel gas flowing through conduit means 14. Signal 24 is provided from the analyzer transducer 21 to computer means 100.

Analyzer transducer 31 is preferably a chromatographic analyzer capable of measuring the concentration of various constituents in a gaseous mixture. A sample of the fuel gas flowing through conduit means 14 is provided to the analyzer transducer 31 through conduit means 32. Signal 34, provided from the analyzer transducer 31, will be representative of the concentration of a plurality of components in the fuel gas flowing through conduit means 14. Signal 34 is provided from the analyzer transducer 31 to computer means 100. The constituents of the fuel gas stream flowing through conduit means 14 for which a concentration is determined will be discussed more fully hereinafter.

Pressure transducer 41 in combination with a pressure sensing device operably located in conduit means 14 provides an output signal 42 which is representative of the actual pressure of the fuel gas flowing through conduit means 14. Signal 42 is provided from the pressure transducer 41 as an input to computer means 100.

Temperature transducer 44 in combination with a temperature measuring device operably located in conduit means 14 provides an output signal 45 which is representative of the actual temperature of the fuel gas flowing through conduit means 14. Signal 45 is provided from the temperature transducer 44 as an input to computer means 100.

In response to the described input signals, computer means 100 calculates the flow rate of the high BTU fuel gas stream flowing through conduit means 11 required to maintain the actual BTU content of the fuel gas stream flowing through conduit means 14 as close as possible to a desired BTU content without allowing condensation to occur in the fuel gas stream flowing through conduit means 14. Signal 51, which is representative of this desired flow rate, is provided from computer means 100 as the set point input to the flow controller 52. The flow transducer 54 in combination with the flow sensor 55, which is operably located in conduit means 11, provides an output signal 56 which is representative of the actual flow rate of the fuel gas flowing through conduit means 11. The flow controller 52 provides an output signal 58 which is responsive to the difference between signals 51 and 56. Signal 58 is provided from the flow controller 52 to the control valve 59 which is operably located in conduit means 11. The control valve 59 is manipulated in response to signal 58 to thereby maintain the actual flow rate of the fuel gas flowing through conduit means 11 substantially equal to the desired flow rate as represented by signal 51.

The following discussion regarding the dew point calculation for the present invention is provided to simplify the computer logic illustrated in FIG. 2 and illustrate the basis for the dew point calculation. The dew point temperature is characterized by the known relationship $$\sum_{i=1}^{n} \frac{y_i}{k_i} = 1 \quad (1)$$

where $y_i$ = mol fraction of component i in the gaseous mixture;

$k_i$ = equilibrium constant of component i in the gaseous mixture; and n = number of components in a gaseous mixture.

The relative volatility of component i is defined as $$\alpha_i = K_i/K_r \quad (2)$$

where $\alpha_i$ = relative volatility of component i; and $k_r$ = equilibrium constant of a reference component.

Substituting Equation (2) into Equation (1) gives $$K_r = \sum_{i=1}^{n} \frac{y_i}{\alpha_i} \quad (3)$$

$K_r$ can be fit to the Equation $$PK_r = a_0 + a_1 T + a_2 T^2 + b_0 P \quad (4)$$

where

P = pressure of gaseous mixture;

T = dew point of the gaseous mixure; and $a_0, a_1, a_2$ and $b_0$ are constants.

Substituting Equation (3) into Equation (4) yields $$P \sum_{i=1}^{n} \frac{y_i}{\alpha_i} = a_0 + a_1 T + a_2 T^2 + b_0 P \quad (5)$$

Solving Equation (5) for the dew point temperature T yields $$T = \frac{-a_1 + \sqrt{a_1^2 - 4a_2\left[a_0 + P\left(b_0 - \sum_{i=1}^{n} \frac{y_i}{\alpha_i}\right)\right]}}{2a_2} \quad (6)$$

$y_i$ is determined by chromatographic analysis. A fuel gas stream will generally primarily contain methane. However, small concentrations of carbon dioxide, nitrogen, ethane, propane, isobutane, normal butane, isopentane and normal pentane may also be expected. The equilibrium constants K for these components may be determined from standard charts for equilibrium constants such as are presented in the *Engineering Data Book*, 7th Edition, Natural Gasoline Supply Men's Association, 1957. A particular component is chosen as the reference component and $\alpha_i$ can then be determined as a function of the pressure of the gaseous mixture. The value for $\alpha_i$ for typical components in a fuel gas stream using $iC_4$ as the reference component is as follows:

| Component: | $\alpha_i$ |
|---|---|
| $CO_2$ | 9.98 |
| $N_2$ | 276.93 − 3.1787 * P |
| $C_1$ | 94.975 − 1.0382 * P |
| $C_2$ | 15.898 − .14823 * P |
| $C_3$ | 3.6512 − 0.2312 * P |
| $iC_4$ | 1.0 |
| $nC_4$ | .48929 + .0038377 * P |
| $C_5$ + | −.16993 + .0061622 * P |

The value of the constants $a_0, a_1, a_2$ and $b_0$ may be determined by plotting $PK_r$ as a function of T and then utilizing a least squares curve fit to derive $a_0, a_1, a_2$ and $b_0$. Calculated values for these constants are as follows:

$a_0 = 144.033$ $a_1 = 1.388$ $a_2 = 0.0029558$ $b_0 = 0.3389$

Since all of the terms of Equation (6) will be known, Equation (6) may be solved by the computer to calculate the actual dew point temperature of the gaseous mixture flowing through conduit means 14 based on the analysis of the fuel gas and the pressure of the fuel gas. This calculation is utilized in the computer logic as will be described hereinafter.

The logic flow diagram utilized to calculate the control signal 51 in response to the previously described input signals to computer means 100 is illustrated in FIG. 2. Referring now to FIG. 2, computer means 100 is shown as a solid line surrounding the flow logic.

Signal 42, which is representative of the pressure of the fuel gas flowing through conduit means 14, is provided as an input to the actual dew point calculation block 61. Signal 34, which will be representative of the mole fraction of a plurality of components in the fuel gas flowing through conduit means 14, is also provided as an input to the actual dew point calculation block 61. As has been previously stated in the discussion of the dew point calculation, signal 34 will typically provide the actual dew point calculation block 61 with information concerning the mole fraction of carbon dioxide, nitrogen and the $C_1$-$C_5$ hydrocarbons in the fuel gas flowing through conduit means 14.

Using Equation 6 and the relative volatilities of each component together with the constants required to solve Equation 6 which have been previously discussed, the actual dew point calculation block provides an output signal 63 which is representative of the actual dew point of the fuel gas flowing through conduit means 14. Signal 63 is provided from the actual dew point calculation block 61 as an input to the proportional-integral-derivative (P-I-D) controller block 64.

Signal 45, which is representative of the actual temperature of the fuel gas flowing through conduit means 14, is provided to the minuend input of the summing block 65. Signal 68, which is representative of the number of degrees it is desired to maintain the actual dew point of the fuel gas flowing through conduit means 14 below the actual temperature is provided to the subtrahend input of the summing block 65. Signal 68 will generally be in the range of about 5° F. to above 15° F.

Signal 68 is subtracted from signal 45 to establish signal 69 which is provided as the set point input to the P-I-D controller block 64.

The P-I-D controller block 64 establishes an output signal 71 which is responsive to the difference between signals 63 and 69. Signal 71 is scaled so as to be representative of the flow rate of the fuel gas flowing through conduit means 11 required to maintain the actual dew point temperature of the fuel gas flowing through conduit means 14 below the actual temperature of the fuel gas flowing through conduit means 14 by the number of degrees represented by signal 68. Signal 71 is provided as a first input to the low select block 72.

Signal 24, which is representative of the BTU content of the fuel gas flowing through conduit means 14, is provided as the process variable input to the P-I-D controller block 75. The P-I-D controller block 75 is also provided with a set point signal 76 which is representative of the desired BTU content of the fuel gas flowing through conduit means 14. The P-I-D controller block 75 establishes an output signal 78 which is responsive to the difference between signals 24 and 76. Signal 78 is scaled so as to be representative of the flow rate of the fuel gas flowing through conduit means 11 required to maintain a desired BTU content for the fuel gas flowing through conduit means 14. Signal 78 is provided from the P-I-D controller block 75 as a second input to the low select 72.

The low select block 72 selects the lower of signals 71 and 78 to be provided as signal 51 from computer means 100. The control signal 51 is utilized as has been previously described.

In general, signal 78 will be provided as signal 51 since the primary object of mixing two fuel gas streams is to provide a mixed fuel gas stream having a desired BTU content. However, if the temperature of the mixed fuel gas stream flowing through conduit means 14 comes within the number of degrees represented by signal 68 of the actual dew point temperature of the mixed fuel gas stream, signal 71 is selected as signal 51 to ensure that condensation does not occur. This may result in the mixed fuel gas stream flowing through conduit means 14 having a lower than desired BTU content but this is more desirable than for the mixed fuel gas stream to have liquid present.

The invention has been described in terms of a preferred embodiment as illustrated in FIGS. 1 and 2. Specific control components which can be used in the practice of the invention as illustrated in FIG. 1 such as flow sensor 55, flow transducer 54, flow controller 52, control valve 59, temperature transducer 44, and pressure transducer 41 are each well known, commercially available control components such as are illustrated and described at length in Perry's *Chemical Engineer's Handbook*, 4th Edition, Chapter 22, McGraw-Hill. A suitable analyzer which may be used for the BTU analyzer 21 and the chromatographic analyzer 31 is the Process Chromatograph System, Model 102, manufactured by Applied Automation, Inc., Bartlesville, Okla.

While the invention has been described in terms of the presently preferred embodiment, reasonable variations and modifications are possible by those skilled in the art as has been discussed. Such variations and modifications are within the scope of the described invention and the appended claims.

That which is claimed is:
1. Apparatus comprising:
 a burner means;
 means for combining a first fuel gas stream with a second fuel gas stream to form a mixed fuel gas stream, wherein said first fuel gas stream has a higher BTU content than said second fuel gas stream;
 means for supplying said mixed fuel gas stream to said burner means;
 means for establishing a first signal reprsentative of the actual BTU content of said mixed fuel gas stream;
 means for establishing a second signal representative of the desired BTU content of said mixed fuel gas stream;
 means for comparing said first signal and said second signal and for establishing a third signal responsive to the difference between said first signal and said second signal, wherein said third signal is scaled so as to be representative of the flow rate of said first fuel gas stream required to maintain the actual BTU content of said mixed fuel gas stream substantially equal to the desired BTU content for said mixed fuel gas stream;
 means for establishing a fourth signal representative of the actual dew point temperature for said mixed fuel gas stream;
 means for establishing a fifth signal representative of the actual temperature of said mixed fuel gas stream;
 means for establishing a sixth signal representative of a desired difference between said fourth signal and said fifth signal;
 means for subtracting said sixth signal from said fifth signal to establish a seventh signal;
 means for comparing said fourth signal and said seventh signal and for establishing an eighth signal responsive to the difference between said fourth signal and said seventh signal, wherein said eighth signal is scaled so as to be representative of the flow rate of said first fuel gas stream required to maintain the desired difference between said fourth signal and said fifth signal;
 means for establishing a ninth signal representative of the lower of said third and eighth signals; and
 means for manipulating the flow rate of said first fuel gas stream in response to said ninth signal.

2. Apparatus in accordance with claim 1 wherein said means for establishing said fourth signal comprises:
 means for establishing a tenth signal representative of the actual pressure of said mixed fuel gas stream;
 means for establishing a plurality of eleventh signals which are each respectively representative of the concentration of a component of said mixed fuel gas stream;
 means for establishing a plurality of twelfth signals which are each respectively representative of the relative volatility of a particular component in said mixed fuel gas stream; and
 means for establishing said fourth signal in response to said tenth, said plurality of eleventh, and said plurality of twelfth signals.

3. Apparatus in accordance with claim 1 wherein said means for manipulating the flow rate of said first fuel gas stream in response to said ninth signal comprises:
 means for establishing a tenth signal representative of the actual flow rate of said first fuel gas stream;
 means for comparing said ninth signal and said tenth signal and for establishing an eleventh signal responsive to the difference between said ninth signal and said tenth signal, wherein said eleventh signal is scaled so as to be representative of a valve position which will provide an actual flow rate of said first fuel gas streams substantially equal to the desired flow rate represented by said ninth signal;

a control valve means operably located so as to control the flow rate of said first fuel gas stream; and means for providing said eleventh signal as a control signal to said control means.

4. A method for controlling the mixing of a first fuel gas stream with a second fuel gas stream to form a mixed fuel gas stream, wherein said first fuel gas stream has a higher BTU content than said second fuel gas stream, said method comprising the steps of:

establishing a first signal representative of the actual BTU content of said mixed fuel gas stream;

establishing a second signal representative of the desired BTU content of said mixed fuel gas stream;

comparing said first signal and said second signal and establishing a third signal responsive to the difference between said first signal and said second signal, wherein said third signal is scaled so as to be representative of the flow rate of said first fuel gas stream required to maintain the actual BTU content of said mixed fuel gas stream substantially equal to the desired BTU content for said mixed fuel gas stream;

establishing a fourth signal representative of the actual dew point temperature for said mixed fuel gas stream;

establishing a fifth signal representative of the actual temperature of said mixed fuel gas stream;

establishing a sixth signal representative of a desired difference between said fourth signal and said fifth signal;

subtracting said sixth signal from said fifth signal to establish a seventh signal;

comparing said fourth signal and said seventh signal and establishing an eighth signal responsive to the difference between said fourth signal and said seventh signal, wherein said eighth signal is scaled so as to be representative of the flow rate of said first fuel gas stream required to maintain the desired difference between said fourth signal and said fifth signal;

establishing a ninth signal representative of the lower of said third and eighth signals; and manipulating the flow rate of said first fuel gas stream in response to said ninth signal.

5. A method in accordance with claim 4 wherein said step of establishing said fourth signal comprises:

establishing a tenth signal representative of the actual pressure of said mixed fuel gas stream;

establishing a plurality of eleventh signals which are each respectively representative of the concentration of a component of said mixed fuel gas stream;

establishing a plurality of twelfth signals which are each respectively representative of the relative volatility of a particular component in said mixed fuel gas stream; and establishing said fourth signal in response to said tenth, said plurality of eleventh, and said plurality of twelfth signals.

6. A method in accordance with claim 4 wherein said step of manipulating the flow rate of said first fuel gas stream in response to said ninth signal comprises:

establishing a tenth signal representative of the actual flow rate of said first fuel gas stream;

comparing said ninth signal and said tenth signal and establishing an eleventh signal responsive to the difference between said ninth signal and said tenth signal, wherein said eleventh signal is scaled so as to be representative of a valve position which will provide an actual flow rate of said first fuel gas streams substantially equal to the desired flow rate represented by said ninth signal; and providing said eleventh signal as a control signal to a control valve means operably located so as to control the flow rate of said first fuel gas stream.

* * * * *